United States Patent [19]

Fish

[11] Patent Number: 5,129,184

[45] Date of Patent: Jul. 14, 1992

[54] MAGNETIC SEALING GASKET

[75] Inventor: Elson B. Fish, Lakeville, Ind.

[73] Assignee: Polygon Company, Walkerton, Ind.

[21] Appl. No.: 677,523

[22] Filed: Mar. 29, 1991

[51] Int. Cl.⁵ .............................................. E06B 7/16
[52] U.S. Cl. ....................................... 49/478; 49/489
[58] Field of Search ................. 312/296; 49/478, 489, 49/475, 485

[56] References Cited

U.S. PATENT DOCUMENTS

| | | | |
|---|---|---|---|
| 2,859,495 | 11/1958 | Roberts | 312/296 X |
| 2,932,545 | 4/1960 | Foley | 312/296 |
| 3,077,644 | 2/1963 | Kesling | 49/478 X |
| 3,248,159 | 4/1966 | Hall | 49/478 X |
| 3,604,152 | 9/1971 | Protzman | 49/478 X |
| 4,535,563 | 8/1985 | Mesnel | 49/478 |
| 4,891,912 | 1/1990 | Bockwinkel | 49/478 X |

*Primary Examiner*—Kenneth J. Dorner
*Assistant Examiner*—Brian K. Green
*Attorney, Agent, or Firm*—Pearne, Gordon, McCoy & Granger

[57] ABSTRACT

A magnetic sealing device for a refrigeration appliance is disclosed that includes first and second pultruded gaskets, one of the gaskets being connected to the cabinet and the other of the gaskets being connected to the door. One of the gaskets has an extruded magnetic seal strip connected to it that interacts with a magnetically attracted material embedded near the surface of the other gasket. The magnetically attracted material is preferably a ferrous mesh screen and is embedded within at least one of the gaskets during the pultrusion process. When the door is closed against the cabinet the first and second gaskets substantially abut to effectuate a seal therebetween. The first and second gaskets are made of material having a low thermal conductivity so that the accumulation of condensate is reduced or eliminated on the sealing gasket and those portions of the surface of the refrigerator adjacent the gasket. Also, the profile of the gaskets may increase the heat transfer distance to further reduce the formation of condensate.

6 Claims, 1 Drawing Sheet

MAGNETIC SEALING GASKET

BACKGROUND OF THE INVENTION

1. Field of the Invention

This invention relates generally to sealing assemblies, and in particular to a magnetic sealing gasket for creating a seal between the door and cabinet of refrigerators, freezers, and the like.

2. Description of the Prior Art

Many gaskets and seals have been developed over the years to establish a seal for closures such as refrigerator or household doors. In particular, U.S. Pat. No. 3,487,581, issued to Ellingson, Jr., discloses an astragal for door closures that utilizes a pair of flexible strips with magnetic particles embedded therein. The flexible strips are connected to the astragal bar and are employed to effect a closure.

A magnet-containing seal for closures is disclosed in U.S. Pat. No. 3,248,159, issued to Hall. Hall discloses a refrigerator door seal for a double door refrigerator wherein a plurality of flexible magnetic strips are enclosed in plastic extrusions. These are adapted to abut when the doors are in their closed position. Each extrusion has a separate magnetic strip that cooperates with the metal cabinet when the doors are closed.

Another seal for refrigerators is disclosed in U.S. Pat. No. 3,378,957, issued to Frehse. Frehse discloses a seal similar to Hall wherein flexible strips containing magnetic particles are enclosed within plastic extrusions to provide a substantially airtight thermally effective seal between the door and the metal cabinet of the refrigerator.

U.S. Pat. No. 3,077,644, issued to Kesling, discloses a refrigerator door seal for a double door refrigerator wherein flexible strips containing magnetic particles are enclosed in plastic extrusions.

A flexible permanent magnetic material that may be employed for numerous purposes is disclosed in U.S. Pat. No. 2,959,832, issued to Baermann. One such use is with a closure that uses flexible strips formed of extruded plastic material having magnetic particles embedded throughout its entire mass. The fields in the strips are arranged to provide continual attraction when the closure is secured.

Some refrigerator door seals allow the accumulation of condensate on the door seal and the surfaces adjacent the door seal. To solve this problem, U.S. Pat. No. 3,055,193, issued to Smith, incorporates a strip heater in the door seal for keeping the door seal heated at all times to prevent the accumulation of condensate on the seal. The strip heater also prevents accumulation of moisture on the door and cabinet surfaces adjacent the door seal.

Another typical arrangement with household refrigerators is to supply the periphery of the refrigerator and freezer doors with a strip magnet encased within a rubber or other elastomeric shell. When the doors are closed, the strip magnet forms a seal with the metallic skin of the metal cabinet. This arrangement consistently resulted in the accumulation of condensate. To relieve this problem, some manufacturers included a heater behind the metal skin to maintain the skin at a sufficiently high temperature to reduce the accumulation of condensate.

The primary disadvantages of including the heating elements within the strip magnet or refrigerator cabinet are increased production costs and less efficient refrigerators. Also, some seals in the art that didn't utilize the strip heater were made of material susceptible to corrosion and sometimes needed repaired or replaced due to the effects of condensation.

SUMMARY OF THE INVENTION

Accordingly, it is one object of the present invention to provide a novel and improved sealing gasket arrangement for a refrigeration appliance that substantially reduces or eliminates the accumulation of condensate caused by heat transfer between the interior and exterior of the appliance. This is accomplished by supplying the periphery of the cabinet area where the seal is to be created, and the cooperating portion of the door, with a gasket constructed of a material having a low thermal conductivity. At least the gasket on the cabinet includes a magnetically attracted material embedded beneath its sealing surface that interacts with a magnet attached to the gasket on the refrigerator door. Of course, the location of the gaskets may be reversed.

The insulating property of the gasket reduces heat transfer between the interior and exterior of the refrigerator thereby inhibiting the formation of condensate. This feature effectively eliminates the necessity of a heating element within the seal area that is commonly employed in the art to reduce condensation. Consequently, the efficiency of the refrigeration appliance is increased.

The magnetically attracted material is incorporated within its gasket by a conventional pultrusion process and is positioned during the process to be buried just below the sealing surface of the gasket so a proper seal can be effected between the magnetically attracted material and the magnet associated with the gasket on the refrigerator door. Embedding the magnetically attracted material below the sealing surface allows the exterior surface to perform its function of preventing the formulation of condensate. Also, the aesthetics of the gasket are enhanced if the material is buried beneath the sealing surface.

The gaskets may be made from a single pultruded gasket cut to the appropriate lengths, or they could be independently pultruded gaskets. The gaskets preferably extend around the entire perimeter of the cabinet and door although they could extend over only a suitable portion thereof.

During the pultrusion process, the magnetically attracted material is incorporated within the gasket just below the gasket's surface that is relied upon to create the seal. When the gaskets are installed, each one has the magnetically attracted material near its sealing surface because they are cut to length from a single pultruded gasket. Thus, the magnet may be attached to either gasket depending upon the circumstances.

The profile of the gaskets may increase the heat transfer distance further inhibiting the formulation of condensate. The profile of the gasket may vary depending upon the structure to which it is being attached. If some condensation should occur, the material of which the gasket is constructed is corrosion resistant which minimizes the likelihood of damage due to corrosion.

It has been discovered that use of gaskets on both mating surfaces according to the present invention effectively eliminates the accumulation of condensate on a refrigerator while simultaneously creating an efficient seal between the refrigerator door and cabinet. Consequently, there is no need to install heating elements within the refrigerator to reduce condensation. This dual function provides a beneficial advantage over the prior art because the refrigerator may operate more efficiently. Furthermore, the present invention combines relatively low cost construction with easy installation and durability.

DETAILED DESCRIPTION OF THE PREFERRED EMBODIMENT

Figure 2:
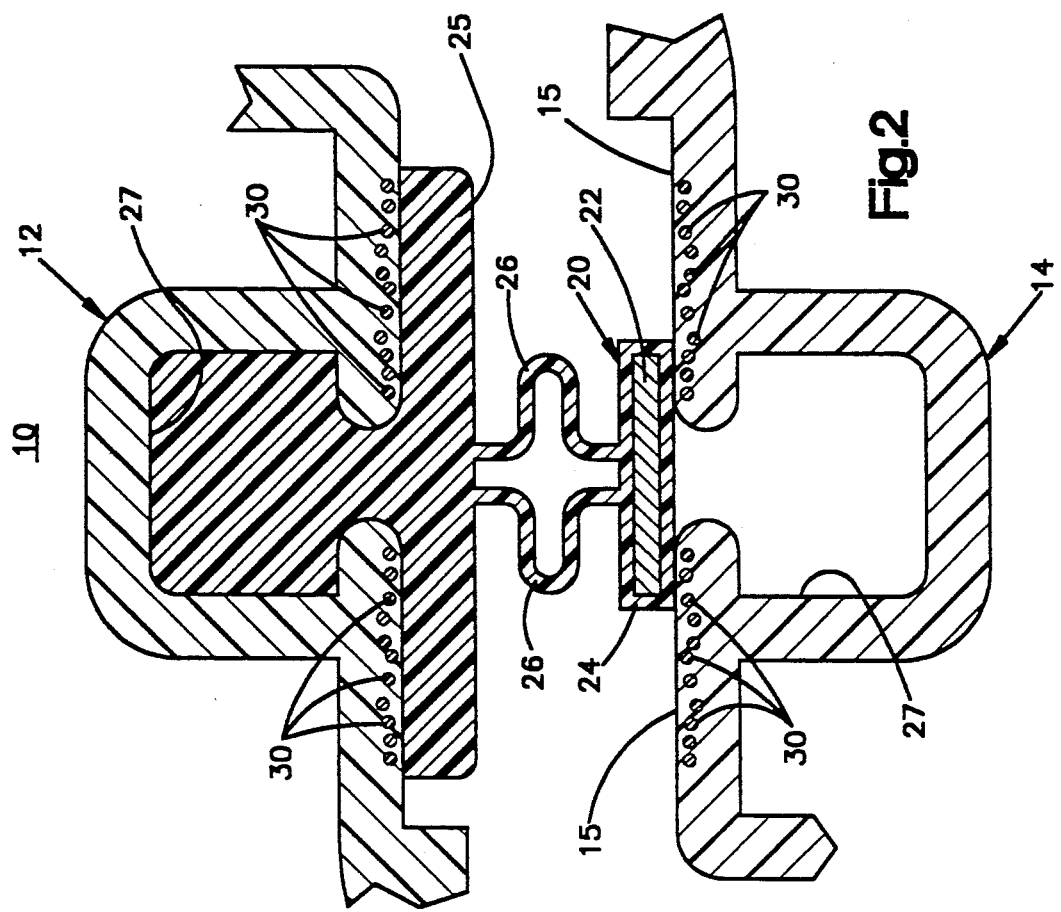
FIG. 2 is an enlarged fragmented view of the sealing gasket shown in FIG. 1 illustrating the sealing gaskets in an initially engaged position.

Referring now to the drawing, there is shown one embodiment of a magnetic sealing gasket 10 according to the present invention. A first gasket 12 and a second gasket 14 are pultruded from a composite material preferably having a low thermal conductivity such as a composite of glass fibers and polyester, vinylester, epoxy, or thermoset resins, or other suitable materials. Each gasket 12 and 14 has a sealing surface 15. The gaskets 12 and 14 are preferably cut to length from a single pultruded gasket, or they may alternatively be pultruded separately.

Each gasket 12 and 14 includes legs 16 and 18 for securing the gaskets to the periphery of a refrigerator door and corresponding cabinet. Preferably, the gaskets 12 and 14 extend around the entire perimeter of the door and cabinet where the seal is to be formed. The gaskets 12 and 14 can be connected to the cabinet and door of a refrigerator in any conventional manner. The cross section of the gaskets 12 and 14 may be other shapes to accommodate the particular purpose for which the gaskets are being used.

The first gasket 12 has a magnetic elastomeric strip seal 20 connected thereto, as best shown in FIG. 2. The seal 20 can be any conventional type such as that manufactured by Magnetic Specialty, Inc. of Marietta, Ohio, and includes a shell 24, a base 25, and a pair of flexible webs 26 connecting the base 25 to the shell 24. A strip magnet 22 is coextruded with the seal 20 to be encased within extruded shell 24. The seal 20 is preferably constructed of a material having a low thermal conductivity such as rubber or the like.

The shell 24 is connected to the extruded base 25 that is locked within a channel 27 of the first gasket 12. Each gasket 12 and 14 includes a channel 27 so that the base 25 may be inserted within either one. Alternatively, the channel 27 could be eliminated if required by the particular application. Consequently, the seal 20 could be attached to gasket 12 in any conventional manner. In this situation, the sealing surface 15 of gasket 12 might extend the entire length of the magnet 20, or it may extend over only a sufficient portion thereof.

The pair of flexible webs 26 connect the seal 20 to the base 25 and compensate for any bowing or misalignment between the door and cabinet to assure the effectiveness of the sealing gasket 10.

Figure 1:
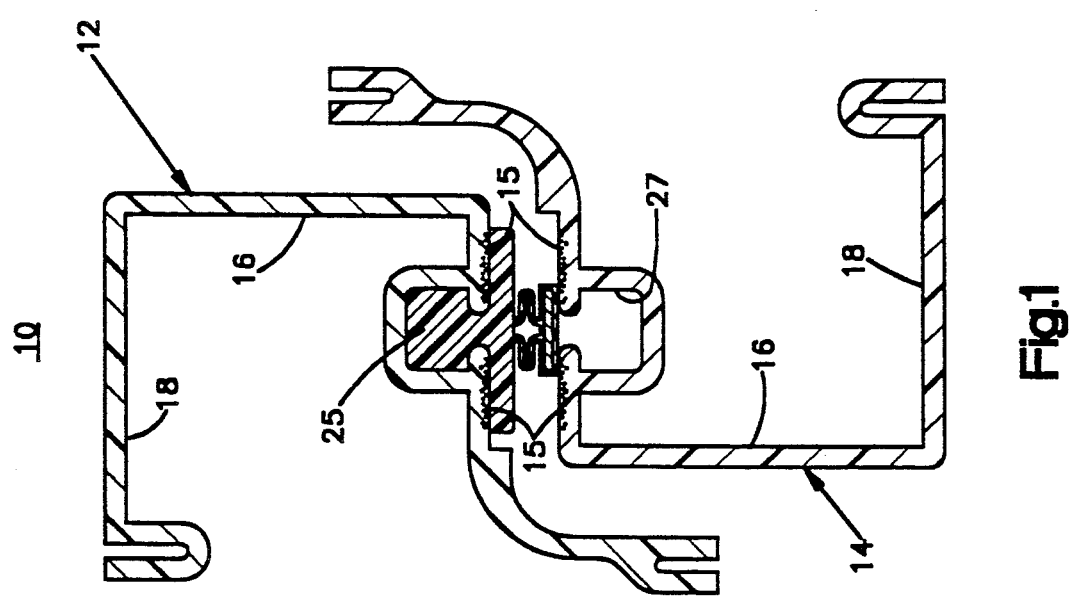
FIG. 1 is a cross-sectional view of a sealing gasket according to the present invention illustrating the sealing gaskets in a fully engaged position.

The gaskets 12 and 14 have embedded beneath their sealing surfaces 15 a magnetically attracted material 30 that is embedded during the pultrusion process. The material 30 is preferably buried between about 0.010 and 0.060 inches beneath sealing surface 15. The embodiment of FIGS. 1 and 2 includes the embedded material 30 within both gaskets 12 and 14 because they are both cut from a single pultruded gasket having the material 30 therein. This arrangement permits the strip magnet 22 to attract the embedded material in both gaskets 12 and 14 as is shown in FIG. 1 to form a tight seal.

According to one aspect of the present invention, a single gasket 14 may be connected in any suitable manner to the periphery of the refrigerator cabinet. The gasket 14 includes the magnetically attracted material 30 that cooperates with a conventional strip seal 20 connected to the periphery of the refrigerator door. In this arrangement the shell 24 may be considered as a low thermal conductivity gasket. The gasket 14 is positioned on the cabinet to align with the conventional strip seal 20 so that when the door is closed the seal 20 forms a seal with the gasket 14. The gasket could alternatively be placed upon the periphery of the refrigerator door with the corresponding periphery of the cabinet connected thereto.

The magnetically attracted material 30 is preferably a high density mesh ferrous screen having between about 40 and 80 holes per square inch. The wire of the screen preferably has a diameter of between about 4 and 5 mil. A ferrous screen having these specifications is used preferably with a strip seal 20 having a multipole type strip magnet 22 about 0.125 inches thick such as that manufactured by Magnetic Specialty, Inc. of Marietta, Ohio.

Alternatively, the material 30 could be metallic fillers, metallic fibers, wire, braided wire, or other suitable material used in combination with other types of seals 20 provided that a sufficient seal is formed.

Although a refrigerator is referred to for the purpose of describing the present invention, it should be realized that the present invention is not necessarily limited to a refrigerator. The present invention is equally applicable to other sealing applications such as walk in coolers, window frames, door frames for outside entrances to houses, or sealing between the freezer and refrigerator compartments of household refrigerators, to name a few.

While the preferred embodiment of the present invention is shown and described herein, it is to be understood that the same is not so limited but shall cover and include any and all modifications thereof which fall within the purview of the invention.

What I claim is:

1. A magnetic sealing device for providing a seal in a space between opposed surfaces of a refrigerator cabinet and door, comprising:

first and second essentially identical elongated gaskets formed from a length of relatively low-thermal-conductivity material;

each of the first and second gaskets having an elongated planar surface, the planar surface of the first gasket facing the planar surface of the second gasket, the first and second gaskets each having a magnetically attracted material entirely embedded therein in an elongated zone beneath the planar surface of the first and second gaskets;

each of the first and second gaskets further defining a partially enclosed longitudinal channel therein formed in said planar surface;

an elongated seal strip formed of flexible resilient material and being mounted to said first gasket, said seal strip having
a base, and a laterally movable operating portion engaging said planar surface of the second gasket; said base being received in said channel of said first gasket; said operating portion having magnetic means disposed therein, said magnetic means cooperating with said magnetically attracted material to form a seal between said first and second gaskets.

2. A magnetic sealing device as recited in claim 1, wherein said magnetically attracted material is a ferrous mesh screen.

3. A magnetic sealing device as recited in claim 2, wherein said ferrous mesh screen includes between about 40 and 80 holes per square inch.

4. A magnetic sealing device as recited in claim 2, wherein said ferrous mesh screen includes a plurality of wire each having a diameter of between about 4 and 5 mil.

5. A magnetic sealing device as recited in claim 1, wherein said magnetically attracted material is buried beneath said sealing surface between about 0.010 and 0.060 inches.

6. A magnetic sealing device as recited in claim 5, wherein the magnetic means is a multipole strip magnet about 0.125 inches thick.

* * * * *